Patented Aug. 11, 1953

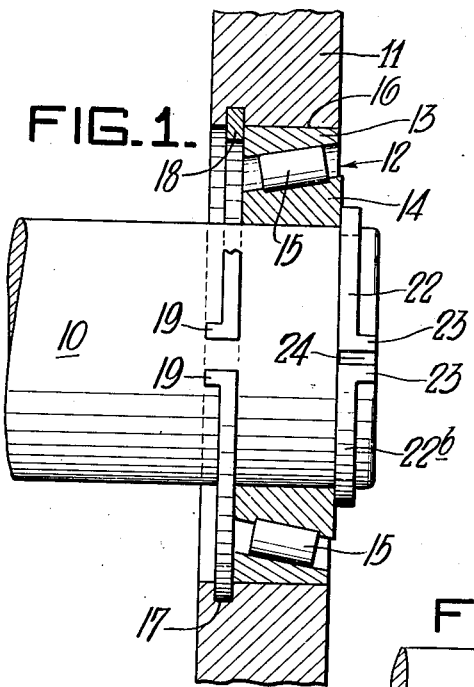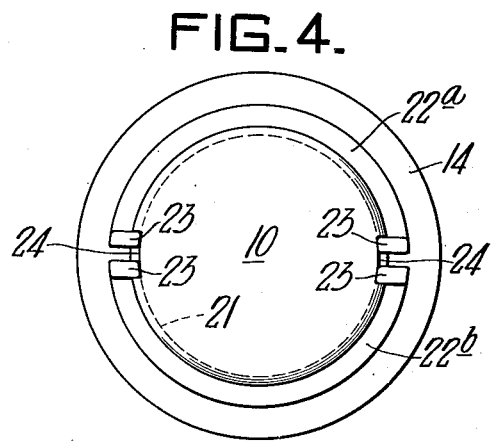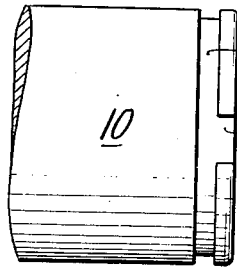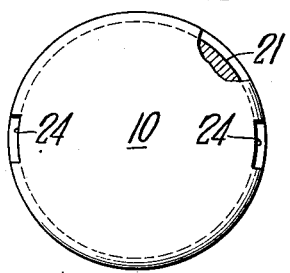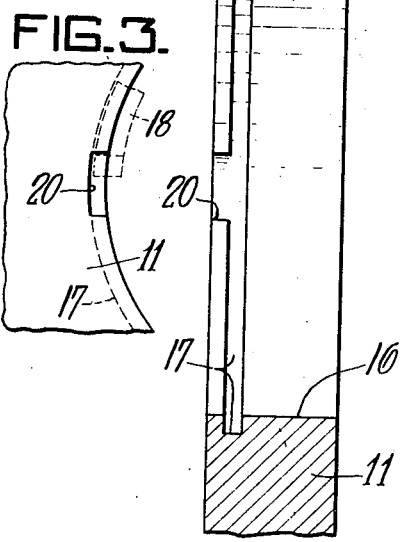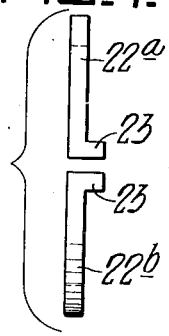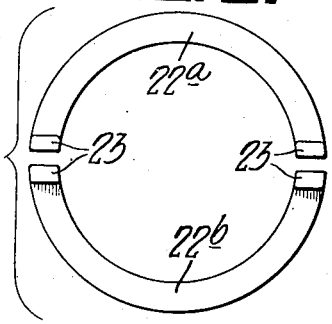

2,648,557

UNITED STATES PATENT OFFICE 2,648,557

SPRING RETAINER RING

Robert G. Stewart, Sr., Pittsburgh, Pa., assignor to United States Steel Corporation, a corporation of New Jersey Application July 21, 1950, Serial No. 175,244

1 Claim. (Cl. 287—52)

This invention relates to a spring ring for use on shafts and in bearing housings, or the like, for retaining parts in assembled relation.

In many machines of various types, self-securing spring retainer rings are employed, usually to resist thrust or prevent relative axial movement, for example, between a shaft and the parts of a bearing in which it is journaled or to limit axial movement of a rod or shaft in a sleeve. In either case, the ring functions to resist a thrust load. Heretofore such rings as usually made have been plain circles with a uniform section and have been continuous throughout substantially 360° except for a single transverse break or opening permitting deformation of the ring by expansion or contraction so it can be applied and removed. Such rings fit in grooves of corresponding sectional shape formed in the part to which they are applied.

Conventional rings of the type described have several disadvantages. Unless accurately made for a tight fit, they are apt to turn in their grooves by friction or vibration from adjacent rotating parts, thus causing wear and increasing the likelihood of ultimate failure. When a break occurs, furthermore, the pieces usually fall out leaving the adjacent part of the machine without restraint, which may have seriously damaging results. Since the rings are integral, considerable deformation is necessary to permit application and removal, even when this is accomplished by axial movement relative to the associated machine part.

I have invented a novel retainer ring which overcomes the aforementioned objections and is characterized by further advantages over the conventional style of ring. In a preferred embodiment, my ring comprises two or more part-circular body portions having axially extending lugs spaced circumferentially thereof adapted to enter slots intersecting the groove formed in the shaft or bearing housing to accommodate the body portion. Usually it will be convenient to provide a pair of semi-circular sections but a unitary ring extending through substantially 360° having a single break or opening may be employed if desired.

A complete understanding of the invention may be obtained from the following detailed description and explanation which refer to the accompanying drawings illustrating a present preferred embodiment. In the drawings:

Figure 1 is a section through the axis of a bearing showing the shaft supported thereby in elevation, with retainer rings of the present invention on the shaft and in the bearing housing;

Figure 2 is a similar view showing the housing with the shaft and bearing removed;

Figure 3 is a partial side elevation of the housing;

Figure 4 is an end elevation of the shaft and the inner race of the bearing;

Figure 5 is a side elevation with the retainer ring removed;

Figure 6 is an end elevation thereof;

Figure 7 is an edge view and Figure 8 a side elevation of the preferred form of my retainer ring.

Referring in detail to the drawings, Figure 1 illustrates the invention as applied to a shaft 10 journaled in a housing or other suitable support 11 on an anti-friction bearing 12 including an outer race 13, an inner race 14 and rollers 15 disposed therebetween. The bearing 12 is disposed in a bore 16 through the housing or support 11. This bore has a groove 17 adjacent one end thereof to accommodate an internal retainer ring 18. The ring 18 is discontinuous at one point at least and preferably two points. That is to say, it may be in one piece or two or even more. In any event, the ring has axially extending lugs 19 preferably formed at the opening or at the ends of the portions thereof. The housing 11 has axial slots 20 therein intersecting the groove 17 and adapted to accommodate the lugs 19 on the ring 18. It will be apparent that when the ring 18 or the separate portions thereof, as the case may be, have been sprung into place, the lugs 19 will snap into the slots 20 thereby firmly anchoring the ring against rotation. When thus positioned, the ring 18 holds the outer race 13 against leftward displacement in the bearing housing.

The shaft 10 is provided with a groove 21 adjacent its end adapted to receive the semi-circular portions 22a and 22b of an external retainer ring similar in structure and principle to the internal ring 18. The ring portions have lugs 23 extending axially from the ends thereof. Shaft 10, furthermore, has axial slots 24 intersecting the groove 21 for accommodating the lugs when the ring portions have been sprung into place on the shaft. The retainer ring 22a, 22b serves to retain the inner race 14 of the bearing 12 in proper position relative to the outer race 13. It will be understood, of course, that the half portions 22a and 22b of the external ring are expanded slightly when being applied or removed whereas the ring 18 or the half portions thereof, in case it is made in two parts, are contracted slightly for application and removal.

The lugs 19 and 23 may extend axially beyond the bearing housing 11 or the end of the shaft 10 to facilitate removal thereof by a suitable tool. Even without this provision, however, it is a relatively simple matter to force the bit of a screw driver, for example, under one of the lugs, thereby springing the entire ring or half portion sufficiently to remove it. The lugs 19 and 23, furthermore, may extend inwardly of the bearing as well as outwardly, the slots 20 and 24 being extended in the appropriate direction in such case. The races of bearing 12 would then have to be slotted axially, of course, to accommodate the lugs which would then serve to key the outer and inner races to the bearing housing and shaft, respectively, and prevent relative rotation therebetween.

It will be apparent from the foregoing that the invention provides a novel and highly useful self-securing retainer ring adapted for numerous applications to various machine parts, to resist limited thrust loads. Since the axial lugs of the retainer rings serve as keys, rotation of the rings in the part on which they are mounted is prevented, thereby eliminating wear and the increased possibility of breakage incident thereto. The two-part retainer ring has the further advantage that, should either part break, the other will serve to maintain the desired relation of the parts and thereby prevent serious damage until the broken half can be replaced. Even after breakage of one ring portion, furthermore, the pieces are not so likely to fall out since they are held in place to some extent by cooperation of their lugs with the slots in the parts with which the rings are associated. Less deformation of the halves of a two-part ring is required for application and removal, than in the case of a one-piece ring.

I claim:

A retainer ring adapted to cooperate with a shaft, bearing or like machine element having a circumferential groove therein and longitudinal slots intersecting said groove, said ring comprising a flat segment so shaped and dimensioned that a circumferential edge thereof will fit snugly in said groove, said segment having a lug extending substantially normal to the plane of the segment at each end thereof, said lugs seating in said slots when the segment is sprung radially and restored to normal shape fitting snugly in said groove.

ROBERT G. STEWART, Sr.

References Cited in the file of this patent

UNITED STATES PATENTS

| Number | Name | Date |
|---|---|---|
| 734,171 | Hamilton | July 21, 1903 |
| 1,043,298 | Clark | Nov. 5, 1912 |
| 1,362,215 | Appelt | Dec. 14, 1920 |
| 1,652,272 | Dawson | Dec. 13, 1927 |
| 1,844,463 | Dodd | Feb. 9, 1932 |
| 2,026,454 | Benzing | Dec. 31, 1935 |
| 2,382,948 | Brozek | Aug. 14, 1945 |
| 2,476,586 | Darash | July 19, 1949 |